(12) United States Patent
Jeon

(10) Patent No.: US 7,012,213 B2
(45) Date of Patent: Mar. 14, 2006

(54) REEL WIRE TYPE OF WELDING DEVICE FOR SPOT WELDING

(75) Inventor: Seon Gyu Jeon, Anyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/891,537

(22) Filed: Jul. 15, 2004

(65) Prior Publication Data

US 2005/0011865 A1     Jan. 20, 2005

(30) Foreign Application Priority Data

Jul. 15, 2003   (KR) ...................... 10-2003-0048298

(51) Int. Cl.
*B23K 11/30* (2006.01)
*B23K 9/24* (2006.01)
(52) U.S. Cl. ............................. 219/119; 219/56; 219/84
(58) Field of Classification Search ................ 219/119, 219/120, 64, 69.12, 84, 81, 82, 86.1, 56; 242/361, 363; 29/712, 709

See application file for complete search history.

(56) References Cited

U.S. PATENT DOCUMENTS

| | | | | |
|---|---|---|---|---|
| 1,308,778 A | * | 7/1919 | Gravell ........................ | 219/82 |
| 4,674,668 A | * | 6/1987 | Cooke .......................... | 226/45 |
| 5,001,321 A | * | 3/1991 | Iwasaki et al. .......... | 219/69.12 |
| 5,515,887 A | * | 5/1996 | Hanagasaki et al. ........ | 140/119 |
| 6,161,787 A | * | 12/2000 | Plociennik et al. ......... | 242/363 |

\* cited by examiner

*Primary Examiner*—Kevin Kerns
*Assistant Examiner*—Michael Aboagye
(74) *Attorney, Agent, or Firm*—Morgan Lewis & Bockius LLP

(57) ABSTRACT

A reel wire type of welding device for spot welding includes a first guiding portion rotatably mounted in a front end of the welding device such that the wire is supported and guided in a working area in which the wire contacts a target object. At least one second guiding portion is mounted in a rear of the roller such that the wire is supportedly guided in a zigzag manner as the wire is pressed in both upward and downward directions.

4 Claims, 4 Drawing Sheets

REEL WIRE TYPE OF WELDING DEVICE FOR SPOT WELDING

CROSS REFERENCE TO RELATED APPLICATIONS

This application claims priority to Korean Application No. 10-2003-0048298. Filed on Jul. 15, 2003, the disclosure of which is incorporated herein by reference.

TECHNICAL FIELD OF THE INVENTION

Generally, the present invention relates to a reel wire type of welding device for spot welding. More particularly, the reel wire type of welding device guides wire more securely and automatically senses abrasion and replacement timing of the wire.

BACKGROUND OF THE INVENTION

Typically, a reel wire type of welding device for spot welding of a vehicle has been proposed and published as Korean patent No. 337502. Such a welding device is reformed from one according to the prior art that has an electrode fixedly inserted as a tip at a shank portion of a welding device.

In more detail, such a welding device includes a working unit, a wire, a first reel, and a second reel. The working unit includes a main body and a support portion. The wire is typically a Cr—Cu series alloy that is frequently used for spot welding. The first reel unrolls the wire and guides the wire to the working unit while the second reel rolls the wire received from the working unit. According to such a spot welding scheme, mutually contacting parts are welded by localized heating. According to such a scheme, a high current flows to overlapping plates to be welded by two overlapping welding devices through the wire.

A drawback of such a welding device occurs if tension between the two reels is lost, as the wire will become loose and unrolled. Therefore, the wire may lose direct contact with the plate such that no current flows between the wire and the plate. Welding is therefore not properly completed, and trouble may be caused by a nonconductive support portion coming into contact with the plate.

SUMMARY OF THE INVENTION

The present invention provides a reel wire type of welding device for spot welding. The present invention improves stableness in guiding a wire and the ability to sense an abrasion and replacement timing of the wire.

An exemplary reel wire type of welding device for spot welding includes a first guiding portion rotatably mounted in a front end of a welding device such that a wire is supported and guided thereby in a working area. Therefore, the wire contacts a target object. At least one second guiding portion mounted in a rear of the roller such that the wire is supportedly guided in a zigzag manner while being pressed in both upward and downward directions.

In a further embodiment, a plurality of optical sensors are employed for sensing a condition of the wire. In another further embodiment, a position detecting sensor for sensing wire abrasion is further included. Such a position detecting sensor includes an elastic spring and a variable resistor element such that wire abrasion is measured by a change of resistivity of the variable resistor element caused by a lengthwise deformation of the elastic spring.

BRIEF DESCRIPTION OF THE DRAWINGS

The accompanying drawings, which are incorporated in and constitute a part of the specification, illustrate embodiments of the invention, and, read together with the detailed description, serve to explain the principles of the invention, wherein.

DETAILED DESCRIPTION OF PREFERRED EMBODIMENTS

Figure 1:
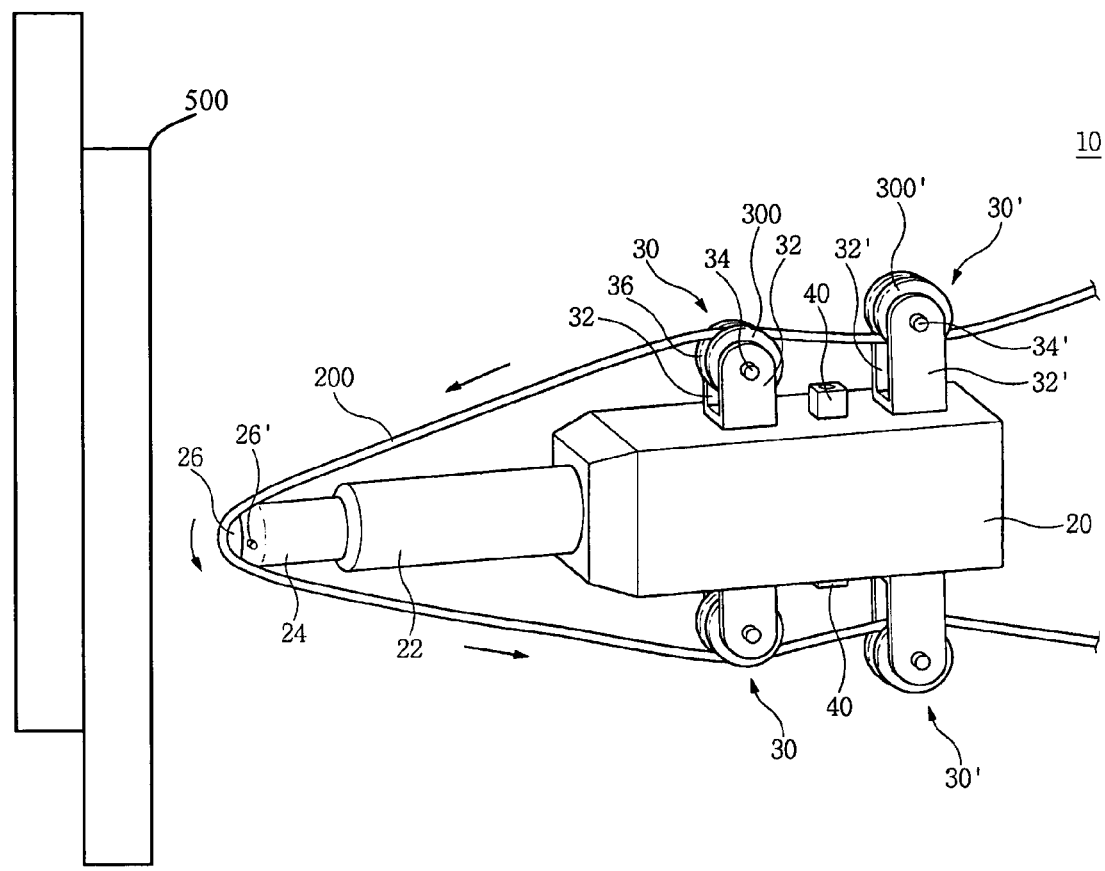
FIG. 1 is a perspective view of a welding device according to an embodiment of the present invention.

According to FIG. 1, the welding device 10 includes a main body 20, an adapter 22, and a support portion 24. The main body 20 extends from a main portion. The adapter 22 extends cylindrically from a front of the main body 20, while the support portion 24 extends from a front of the adapter 22. The wire 200 is supplied in a direction shown by arrows and wound by a reel. During use, the roller 26 is guided toward a target object 500 to be spot welded, such as for example, overlapping pieces of material of a vehicle.

A wire guiding device according to an embodiment of the present invention includes a roller 26, two guiding portions 30, and two guiding portions 30'. The roller 26 is formed toward a front end of the support portion 24 and functions as a guiding portion. The two guiding portions 30 (hereinafter called front guiding portions) are disposed in front sides of the main body 20. The two guiding portions 30' (hereinafter called rear guiding portions) are disposed toward a rear of the sides of the main body 20.

Figure 2:
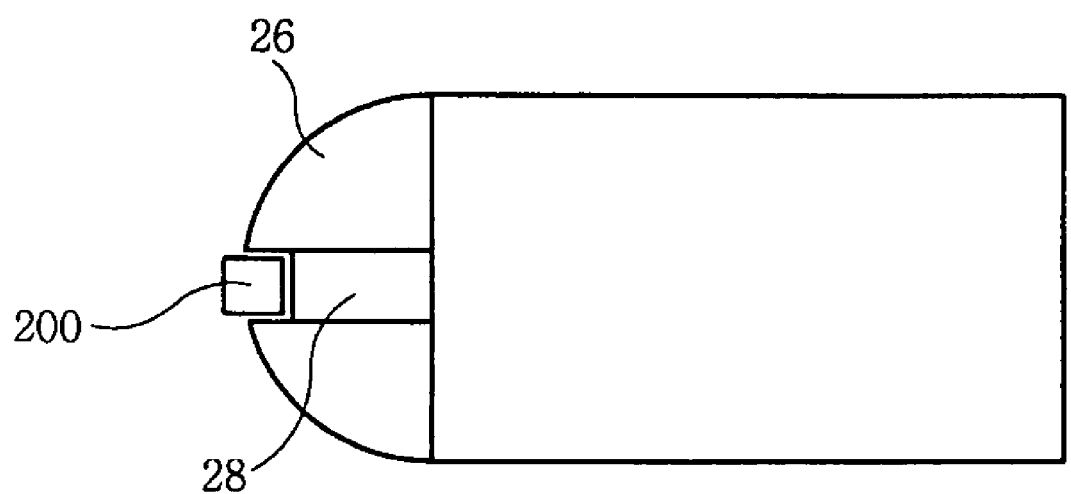
FIG. 2 is an enlarged lateral view of a roller portion of a welding device according to an embodiment of the present invention.

The roller 26 is rotatably connected at the front end of the support portion 24 by the rotating pin 26'. As shown in FIG. 2, the roller 26 is hollowed out at a central part thereof, to form a guiding groove 28. The guiding groove 28 supports and guides the wire 200.

The front guiding portions 30 are formed with a low height, and the rear guiding portions 30' are formed with a height higher than the front guide portions. Such an arrangement produces merits such that the wire may be maintained at a high and constant tension, since the wire is guided in a zigzag manner being pressed in both upward and downward directions. In addition, a formation of rollers 300 and 300' formed in the guiding portions 30 and 30' is the same as that of the roller 26. The front guiding portions 30 are respectively provided with two confronting plates 32, a rolling pin 34, and a roller 300. The rolling pin 34 is tightly fitted into an upper part of the confronting plates 32, and the roller 300 is rotatably mounted on the rolling pin 34.

The formation of the rear guiding portions 30' is almost the same as that of the front guiding portion 30. However, confronting plates 32' of the rear guiding portions 30' are higher than the confronting plates 32 of the front guiding portions 30. Additionally, a position detecting sensor 50 is located between the two confronting plates 32', which is further described below.

According to such a scheme for guiding a wire, the wire changes direction at the roller 26, and is supported by the guiding portions 30 and 30' in both upward and downward directions. Therefore, the wire is prevented from escaping the guide route since the wire is guided by the rollers and problems of defective welding caused by derailment of the wire and mechanical trouble of the support portion are minimized. In addition, the roller 26 can minimize damage to the wire by friction and the roller 26 dissipates heat generated during welding.

According to an embodiment of the present invention, a wire-cut detecting device is further adopted. The wire-cut detecting device includes two optical sensors 40 mounted in the main body 20. The wire-cut detecting device is mounted between the front guiding portions 30 and the rear guiding portions 30'. As shown in FIG. 1, one optical sensor 40 is mounted on one side of the main body 20 and another optical sensor 40 is preferably mounted on the other side of the main body 20. Each of the optical sensors 40 includes a light emitting portion, a light receiving portion, and a transmitting portion. The optical sensors 40 are electrically connected to a pressure welding controller.

Since the light emitting portion and the light receiving portion of the optical sensors 40 face the wire 200, the sensor 40 can transmit a light signal to and receive the same in return from the wire. Because such optical sensors 40 are already known to a person of ordinary skill in the art, details thereof are not described in further detail herein.

If the light emitted from the light emitting portion of the optical sensor 40 is not reflected by the wire 200, the light receiving portion does not sense any light reflected therefrom. In this case, the controller preliminarily determines that the wire is cut. However, non-detection of light by the light receiving portion may accidentally occur by other factors such as reduction and diffusion of light emitted from the sensor 40, and the like. In order to avoid such an erroneous reading it is preferable that signals from both sensors 40 disposed on both sides of the main body 20 are compared before the wire is determined to be cut in the case that a difference between light signals the sensors 40 is larger than a predetermined level or when a light signal is not received from either sensor 40.

Figure 3:
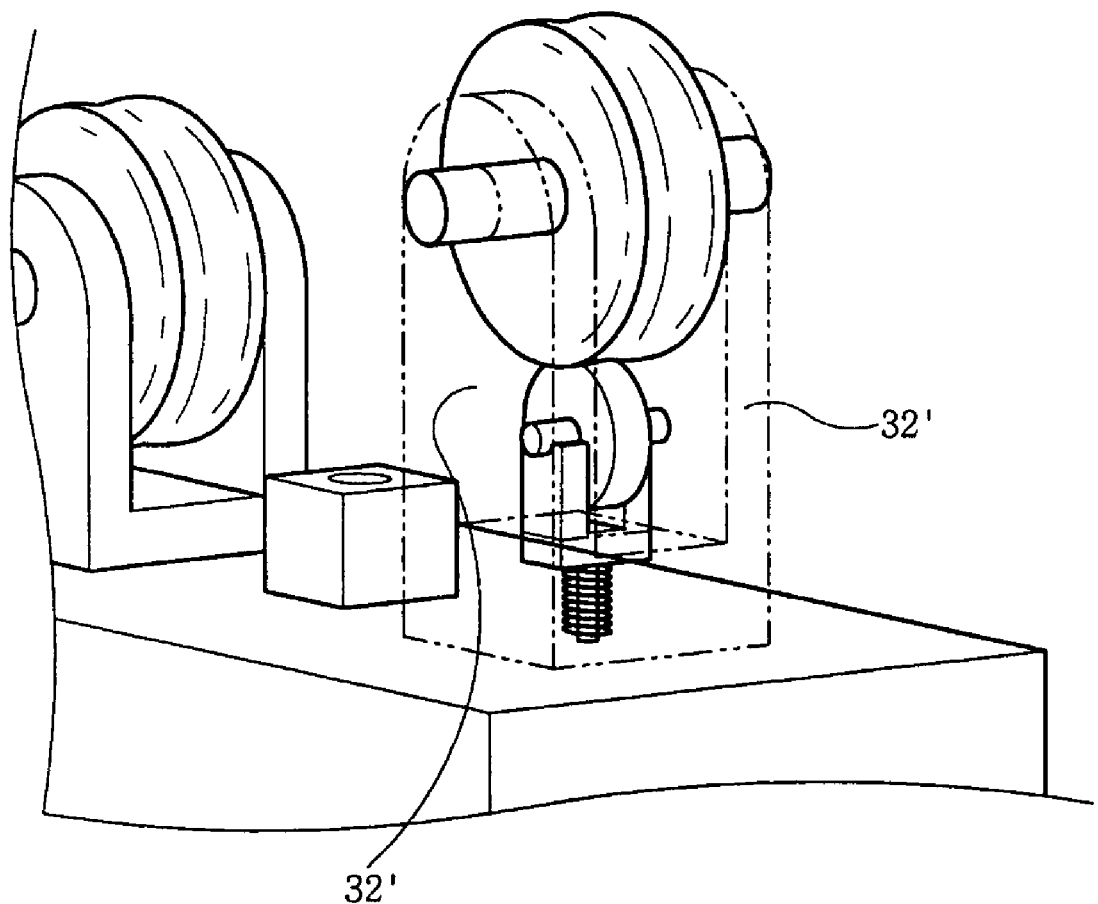
FIG. 3 is an enlarged perspective view of a position detecting sensor of a welding device according to an embodiment of the present invention.

As shown in FIG. 3, a wire abrasion sensing device includes a position detecting sensor 50 mounted between the two plates 32' of guiding portion 30'. Obviously, such a wire abrasion sensing device may be mounted in a plurality of positions.

Figure 4:
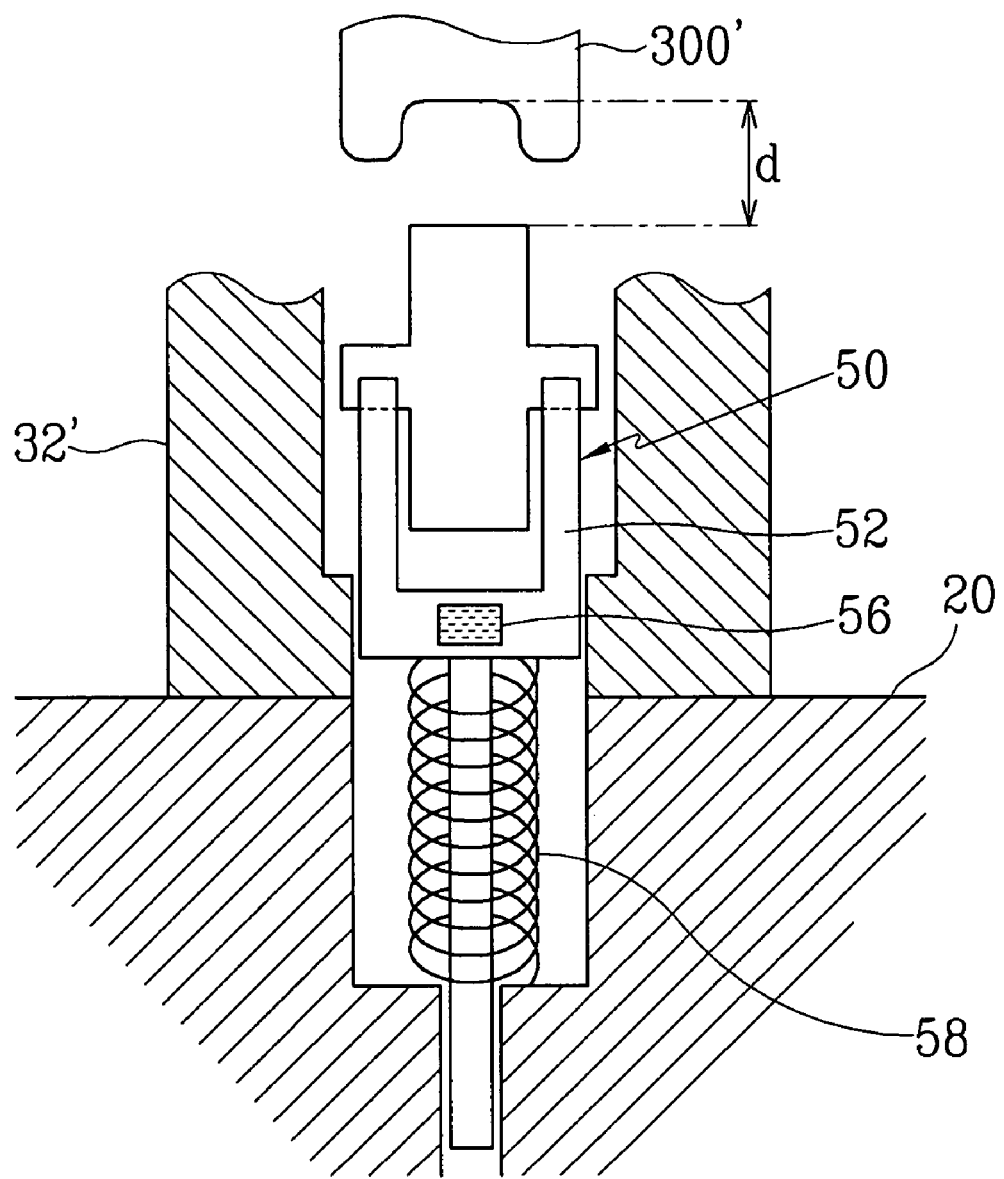
FIG. 4 is a cross-sectional view of the position detecting sensor and its circumstances with respect to a welding device according to an embodiment of the present invention.

An embodiment of a scheme of the position detecting sensor 50 will be hereinafter described in detail with reference to FIG. 4. The position detecting sensor 50 includes an elastic spring 58 and a variable resistor element 56 internally mounted in an upper case 52 of the position detecting sensor 50. The elastic spring 58 supports a bottom of the upper case 52 of the position detecting sensor 50.

An output value of the variable resistor element 56 in the position detecting sensor 50 is changed by the height of the position detecting sensor 50 above the main body 20. Such a position detecting sensor 50 is known to a person of ordinary skill in the art, and is not described in further detail herein.

The upper case 52 is electrically connected to the pressure welding controller by a signal line. An upper side of a roller on the upper case 52 of the position detecting sensor 50 faces the roller 300' of the rear guiding portion 30', and a predetermined clearance d is formed between the upper case 52 of the position detecting sensor 52 and the roller 300'. The wire 200 is guided through the clearance d. As abrasion of the wire 200 increases, the clearance d becomes narrower and the elastic spring 58 gradually expands upwards. Therefore, the position detecting sensor 50 moves upwards and the resistivity of the variable resistor element 56 is varied in accordance with the change of the height of the position.

If an electric current value of the circuit which includes the resistor is lower than a predetermined value (e.g., 50% of the initial value), the controller determines that abrasion of the wire 200 has reached a limit value. Subsequently, it relays the result to workers through a display or alarm.

According to an embodiment, the position detecting sensor 50 supports a lower side of the wire 200. Therefore, it also functions to support and supply tension to the wire 200, in cooperation with the roller 300'.

As a variation of an embodiment of the invention, the variable resistor element 56 of the wire abrasion sensing device can be replaced with, for example, a piezoelectric element or the like. In addition, the electric sensor 50 can be replaced with a display device that can capture an image of the wire such that a thickness of the wire or abrasion of the wire may be determined therefrom.

According to yet another embodiment of the present invention, escaping or derailment of the wire 200 is minimized and spot welding for a vehicle becomes more effective. Additionally, a wire-cut and excessive abrasion of the wire may be automatically detected, and thus a worker may be apprised of causes of abnormal welding. Therefore, the welding process becomes more stable and efficient.

The scope of the present invention is not limited by the above-described details of positions, structure, the number of guiding portions and optical sensors, or the internal structure of the position detecting sensor. While this invention has been described in connection with what is presently considered to be the most practical and preferred embodiment, it is to be understood that the invention is not limited to the disclosed embodiments, but, on the contrary, is intended to cover various modifications and equivalents included within the spirit and scope of the appended claims.

What is claimed is:

1. A reel wire type of welding device for spot welding of a vehicle, comprising:
   a first guiding portion rotatably mounted in a front end of the welding device such that a wire is supported and guided thereby in a working area in which the wire contacts a target object;

at least one second guiding portion mounted in a rear of a roller such that the wire is supportedly guided in a zigzag manner being pressed in both upward and downward directions; and a position detecting sensor for sensing wire abrasion, the position detecting sensor comprising an elastic spring and a variable resistor element such that the wire abrasion is measured by a change of resistivity of the variable resistor element caused by a lengthwise deformation of the elastic spring.

2. The welding device of claim 1, further comprising a plurality of optical sensors for sensing a condition of the wire.

3. A reel wire type welding device for spot welding, comprising:

a first guiding portion rotatably coupled toward a front end of the welding device such that a wire is supported and guided in a working area;

at least one second guiding portion coupled toward a rear of the welding device, said second guiding portion being configured and dimensioned to support the wire and supply tension to the wire; and a position detecting sensor for sensing wire abrasion, the position detecting sensor comprising an elastic spring and a variable resistor element such that wire abrasion is measured by a change of resistivity of the variable resistor element caused by lengthwise deformation of the elastic spring.

4. The welding device of claim 3, further comprising a plurality of optical sensors for sensing a condition of the wire.

* * * * *

UNITED STATES PATENT AND TRADEMARK OFFICE
CERTIFICATE OF CORRECTION

| | | |
|---|---|---|
| PATENT NO. | : 7,012,213 B2 | Page 1 of 1 |
| APPLICATION NO. | : 10/891537 | |
| DATED | : March 14, 2006 | |
| INVENTOR(S) | : Seon Gyu Jeon | |

It is certified that error appears in the above-identified patent and that said Letters Patent is hereby corrected as shown below:

On the front page:

Left column, line (73)

"Hyundai Motor Company, Seoul (KR)"
should be changed to

-- Kia Motors Corporation, Seoul (KR) --

Signed and Sealed this

Eighteenth Day of September, 2007

JON W. DUDAS
*Director of the United States Patent and Trademark Office*